Oct. 22, 1929.   C. W. OWSTON   1,732,415
MACHINE FOR MAKING SPIRAL FIN TUBING
Filed June 3, 1927   6 Sheets-Sheet 3
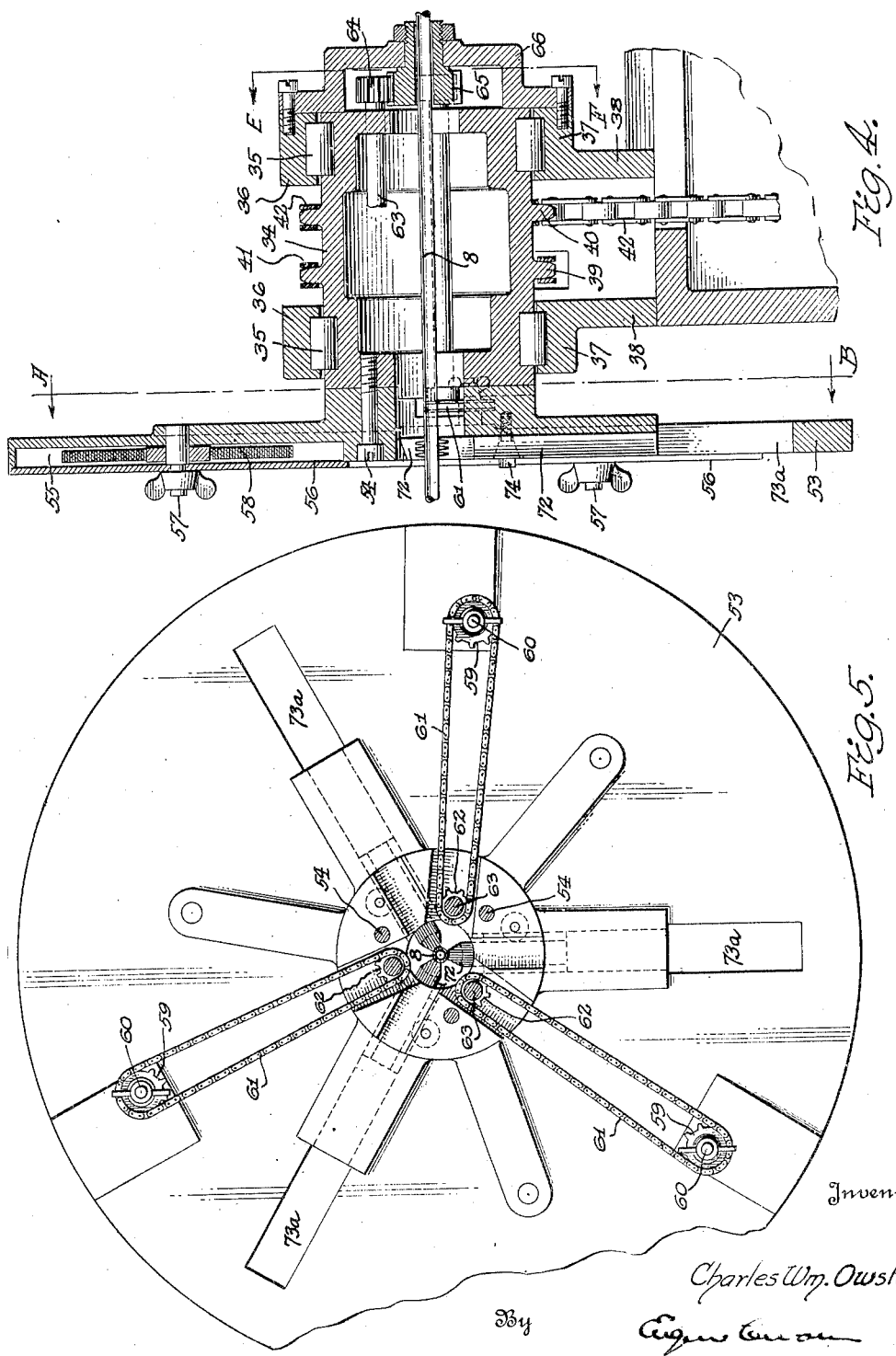

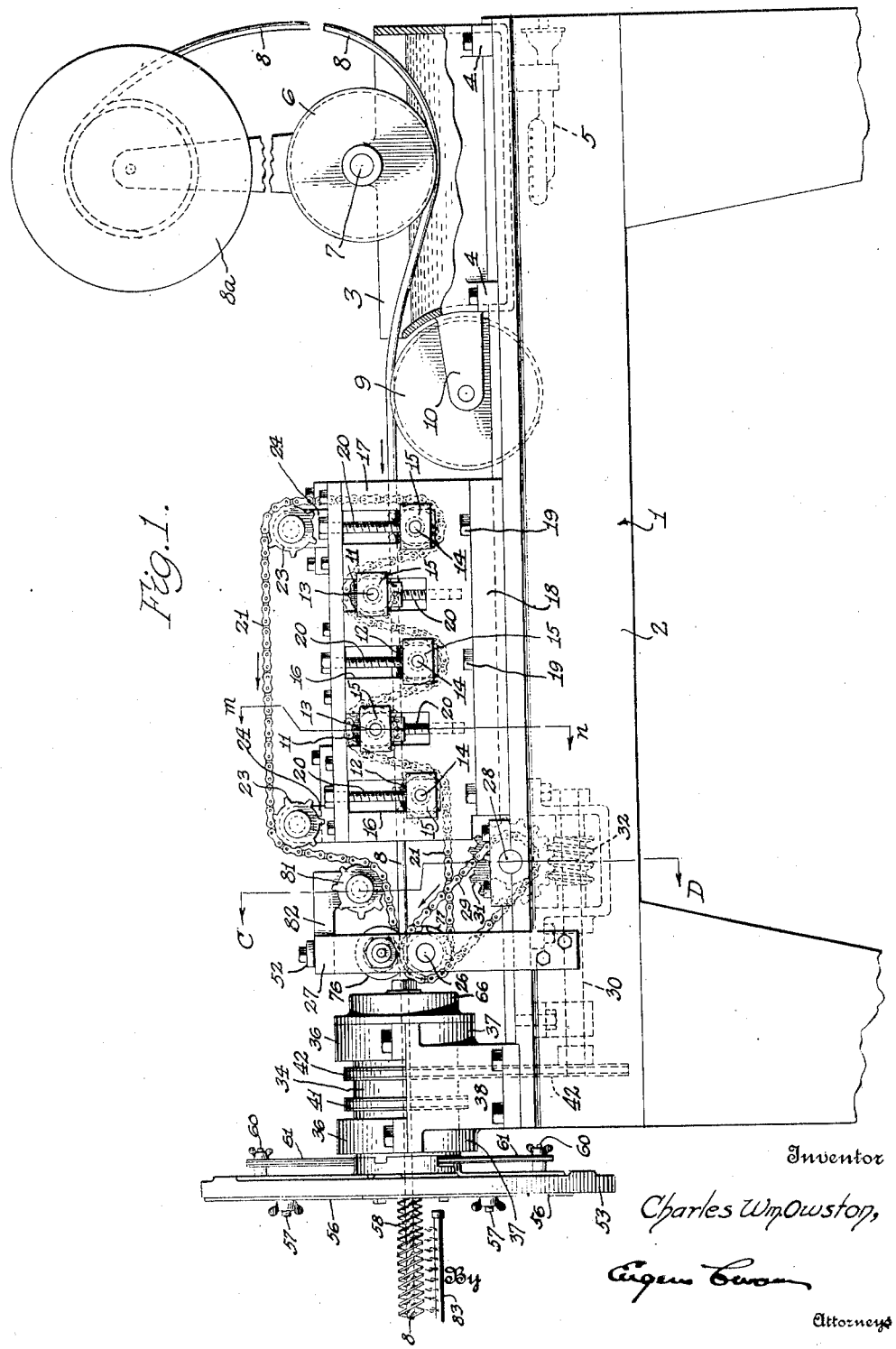

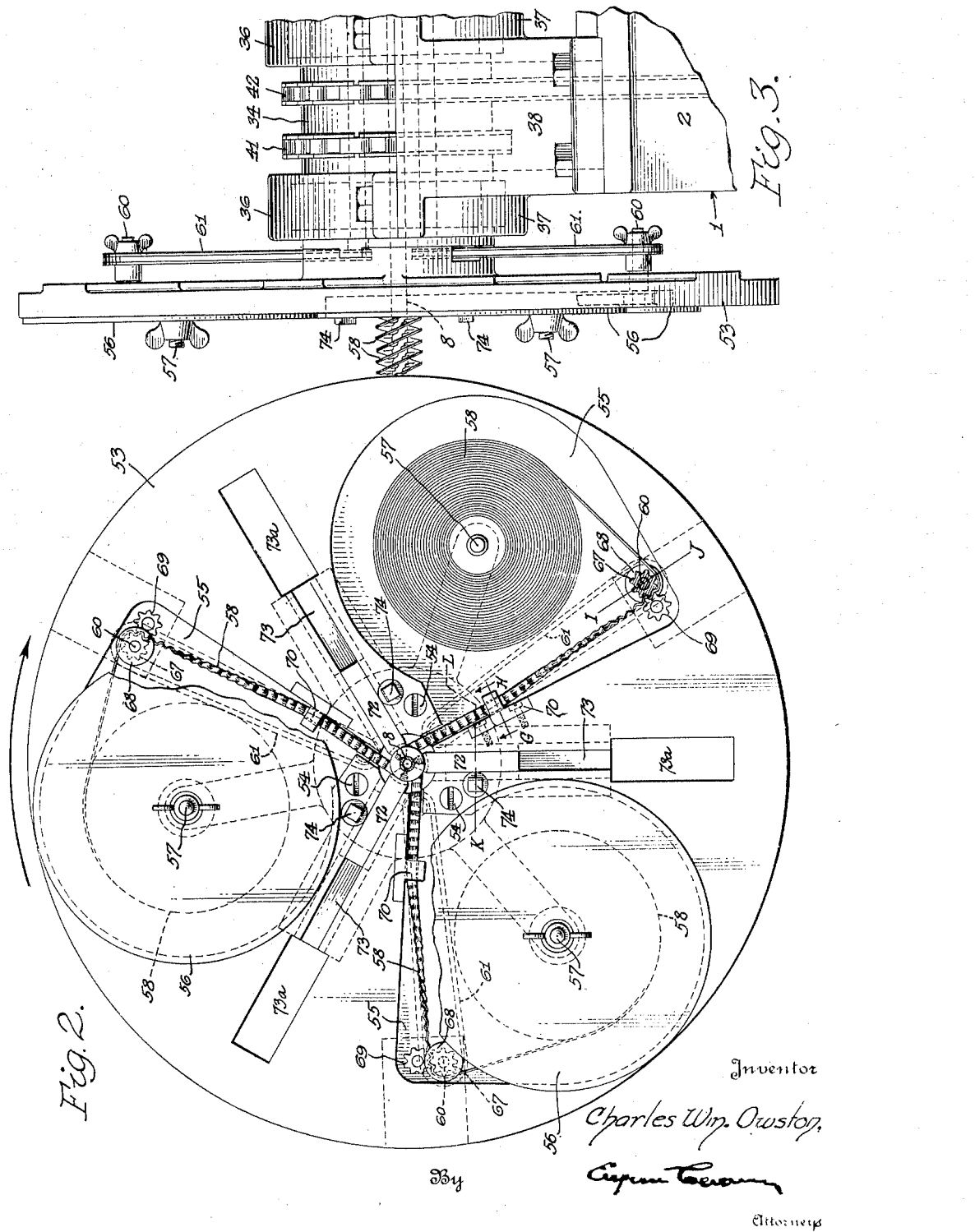

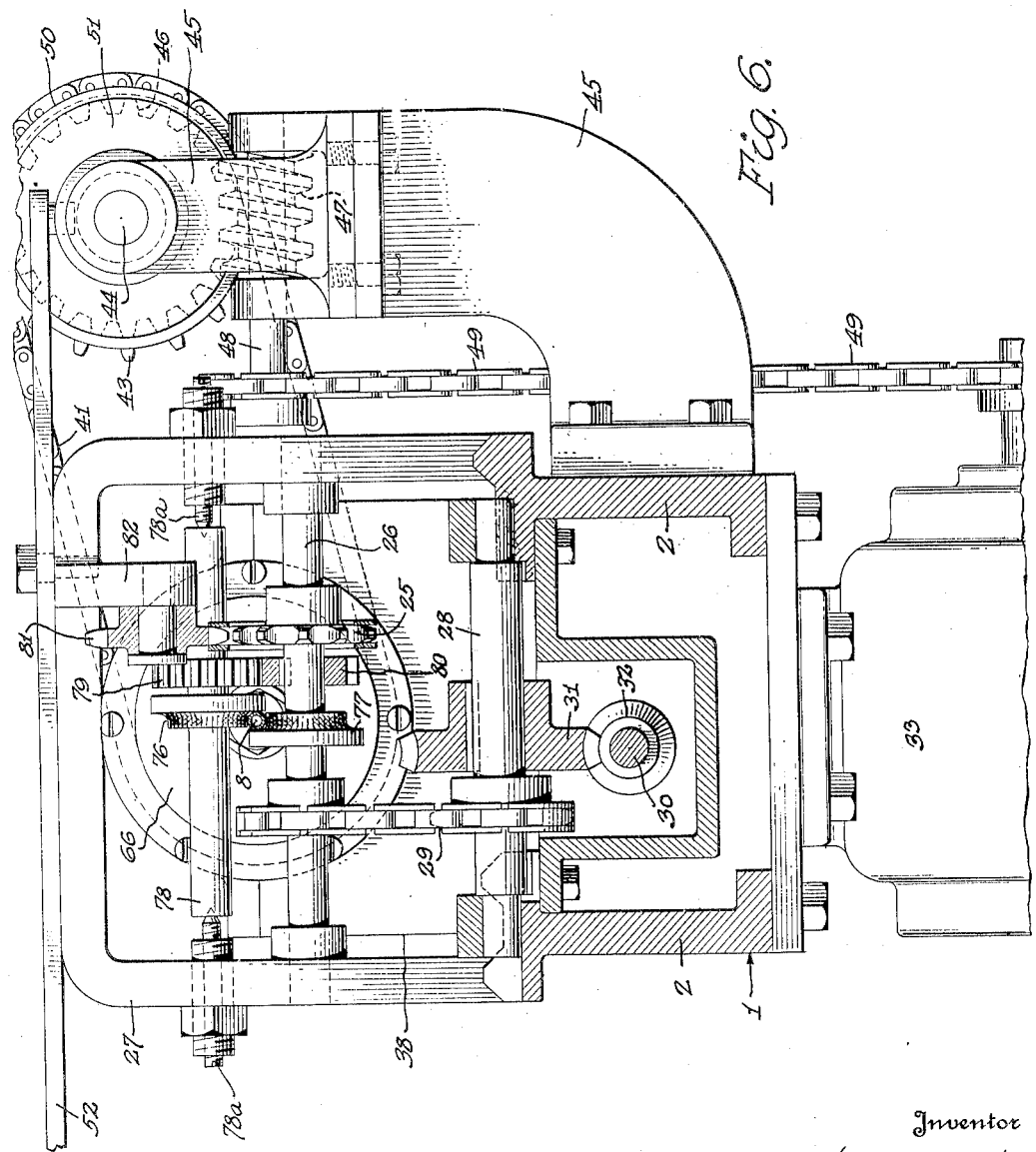

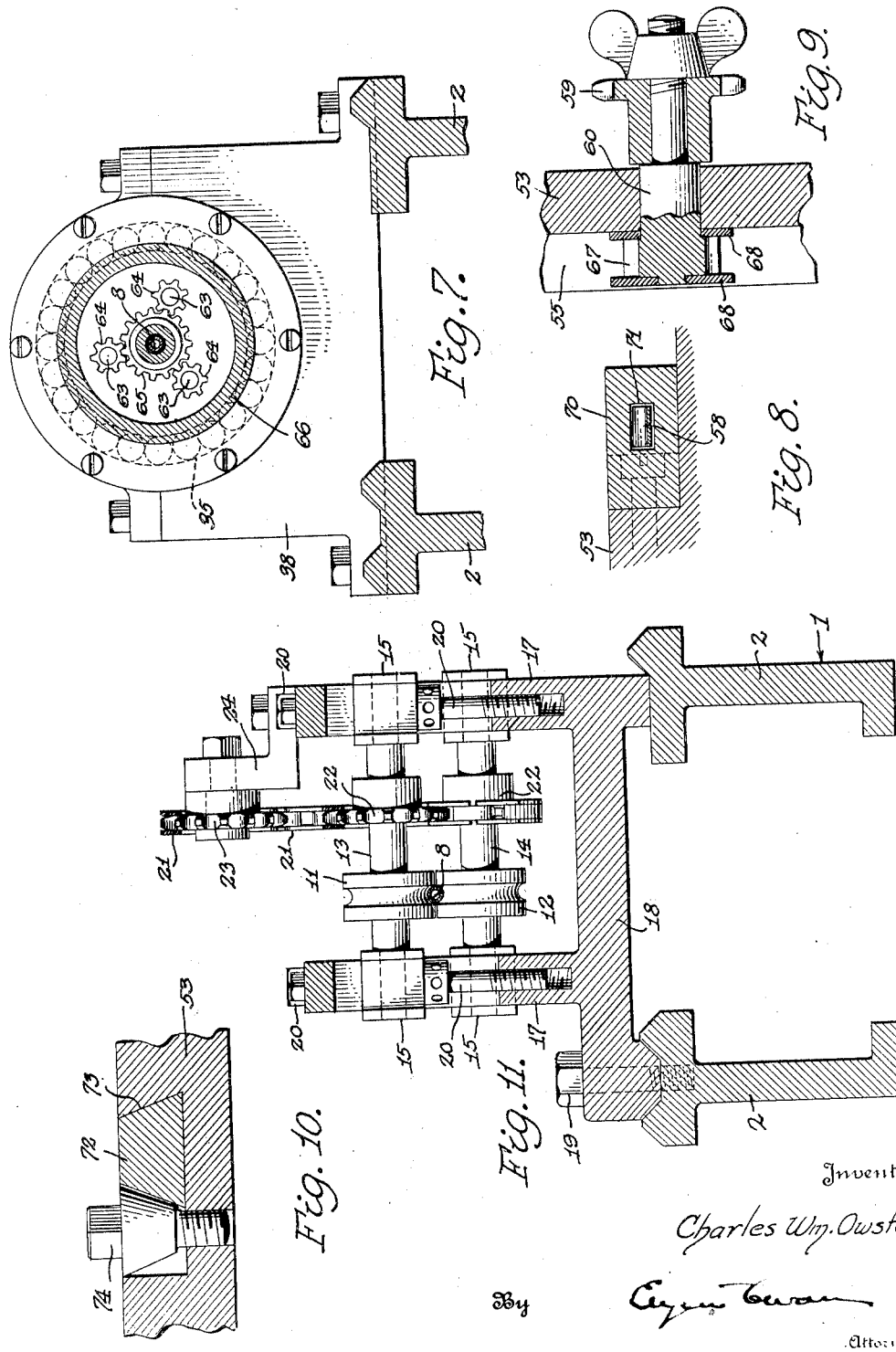

Oct. 22, 1929.     C. W. OWSTON     1,732,415
MACHINE FOR MAKING SPIRAL FIN TUBING
Filed June 3, 1927     6 Sheets-Sheet 6
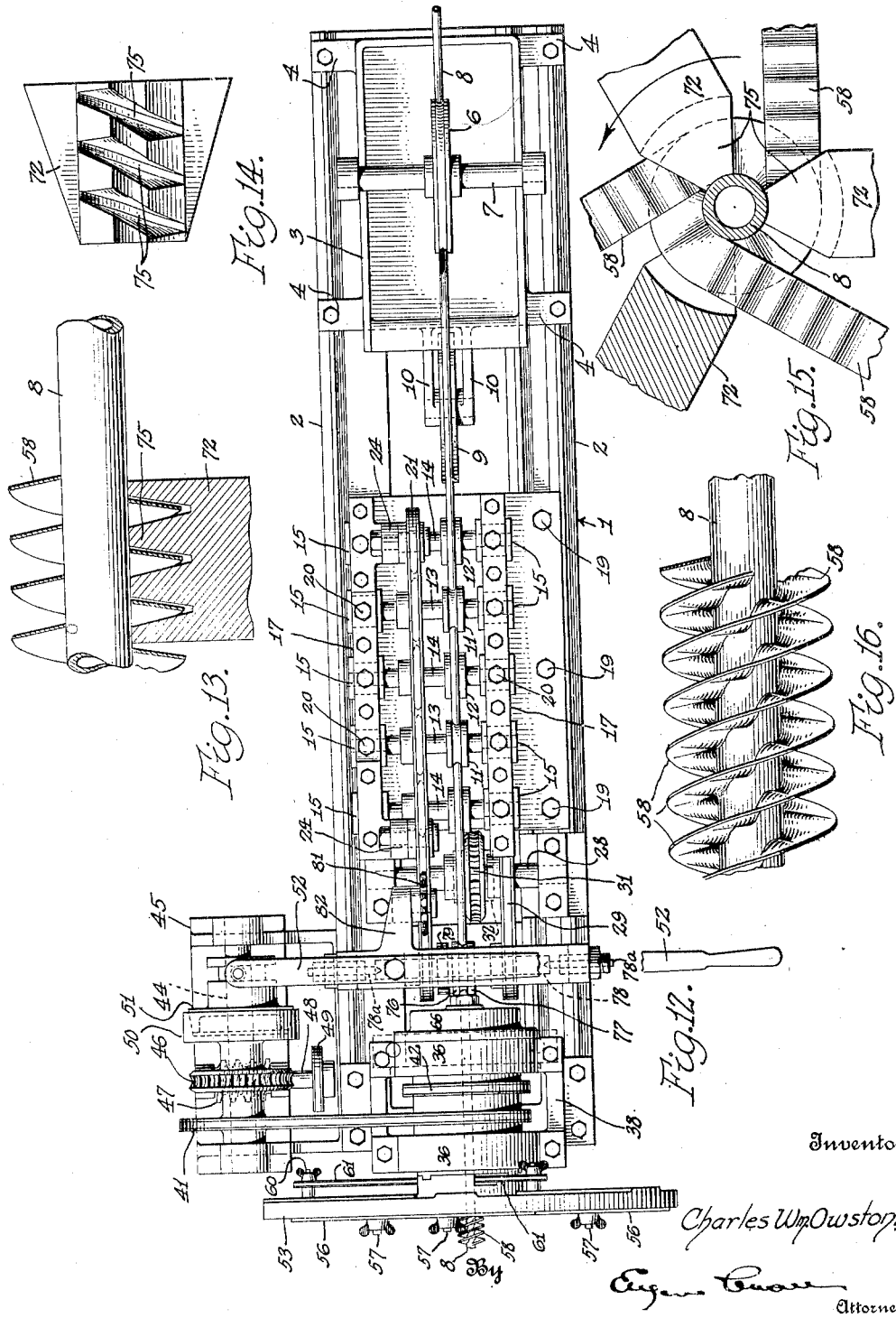
Inventor
Charles Wm Owston,
By
Eugene Penon
Attorney Patented Oct. 22, 1929

1,732,415

UNITED STATES PATENT OFFICE

CHARLES W. OWSTON, OF DETROIT, MICHIGAN

MACHINE FOR MAKING SPIRAL-FIN TUBING

Application filed June 3, 1927. Serial No. 196,368.

This invention relates to machines for making spiral fin tubing.

One object of my invention is to provide a machine in which the fin material is spirally wound on the tube as the latter is fed through the machine without rotating the tube, thereby saving floor space for the machine, as the tube stock may be supplied to the machine directly from a coil or roll placed at the entrance end of the machine without regard for the tube lengths being handled.

Another object of my invention is to apply a plurality of fin strips simultaneously to the tube in a single and continuous operation, and thus increase the output of the machine in direct proportion to the number of strips applied.

A further object of my invention is to apply the several strips initially to the tube in spaced relation endwise of the tube so that the convolutions of the respective strips on the tube follow one another uniformly throughout the entire length of the tube to produce a regular and symmetrical product.

A further object of my invention is to coat the tube with solder before the strips are wound on the tube and thus enable the strip to be secured to the tube by merely heating the tube to fuse the solder after the strips have been applied, and thus avoid the necessity of flowing molten solder over the entire assembly of wound strips and tube with a waste of solder, as heretofore.

A further object of my invention is to provide a machine which is simple in construction and operation and which will produce a regular and uniform product rapidly, continuously, smoothly, and economically.

A further object of my invention is to wind the fin strip material on the tube at an increased pitch so as to increase the heat radiating capacity of the tube by having greater contact between the fin and the tube and sharper air deflecting surfaces for the fins.

The invention consists further in the product produced by my improved method and machine and also in the matters hereinafter described and claimed.

In the accompanying drawings—

Fig. 1 is a side elevational view of a machine for making spiral fin tubing, constructed in accordance with my invention;

Fig. 2 is a front view of the winding head of the machine;

Fig. 3 is a side view of said head;

Fig. 4 is a longitudinal vertical sectional view through the winding head;

Fig. 5 is a view partly in elevation and partly in section looking at the winding disc from the rear side; said view being taken on the line A—B of Fig. 4;

Fig. 6 is a transverse vertical sectional view taken on line C—D of Fig. 1, to show the tube feeding rolls;

Fig. 7 is a vertical sectional view taken on line E—F of Fig. 4;

Figs. 8 to 10 are sectional views illustrating details of structure and taken on lines G—H, I—J, and K—L, respectively, of Fig. 2;

Fig. 11 is a vertical transverse sectional view taken on line M—N of Fig. 1;

Fig. 12 is a top plan view of the complete machine;

Figs. 13 and 14 are sectional and end views, respectively, of one of the guide bars employed for guiding the fin strip onto the tube;

Fig. 15 is a view showing how the several guide bars guide a plurality of strips on a tube; and Fig. 16 shows a tube with strips spirally wound thereon by my improved machine.

The machine of my invention has a horizontal bed 1, similar to that as employed for metal-turning lathes. A bed of this type has upright side rails 2, 2, which are spaced apart as shown in Figs. 6 and 12. A pot 3 to contain molten solder is located at one end of the bed 1 and is supported thereon over the space between the side rails 2, 2 in any suitable manner, as by means of lugs 4, 4 on the pot, as illustrated in Fig. 12. Below the pot 3 is a suitable gas burner 5 for heating the pot and thus maintain the solder therein in molten form during the operation of the machine.

A grooved roll 6 has its lower peripheral portion dipping down into the molten solder in the pot 3, said roll being fixed to a shaft 7 which extends across the top of the pot and has its ends in bearings at the side walls of the pot. The tube stock 8, to be operated on by the machine, is drawn into the same from a suitable source of supply, which may be in the form of a coil 8ª at the entrance end of the machine, as shown in Fig. 1. From this coil the tube 8 first passes down into the molten solder in the pot 3 beneath the lower peripheral portion of the roll 6, in order to continuously coat the outer surface of the tube as it is passed into the machine. After leaving the pot 3, the coated tube 8 passes over the upper peripheral portion of a grooved roll 9, which is located in front of the pot. This roll is supported between bracket arms 10, 10 which are cast or otherwise secured to the pot and project forward therefrom, as shown. The roll 9 is so disposed as to have its upper peripheral portion above the normal level of the coating metal in the pot 3 so as to support the coated tube as it leaves the pot and position it in alignment with the tube-straightening assembly, which is supported on the bed 1 next following the roll 9.

The tube-straightening assembly consists of a set of upper and lower grooved rolls 11, 12, which engage the tube above and below as the tube passes over and under them, respectively, as shown in Fig. 11. These rolls are aligned lengthwise of the machine or in the direction of travel of the tube therethrough so as to straighten the coated tube after leaving the pot 3, as shown in Fig. 1.

The opposite ends of the shafts 13, 14 to which the rolls 11, 12 are fixed, are journaled in suitable bearing blocks 15, 15 disposed in vertical guide-ways 16 in the upright side webs 17, 17 of the support for the straightening assembly. These webs are made part of a base web 18 which extends across the bed of the machine and is secured to the side rails 2, 2 by clamp screws 19 or other suitable means for holding the straightening assembly in a fixed position on the bed. The bearing blocks 15 are provided with suitable adjusting screws 20, 20, by means of which the straightening rolls 11, 12 may be adjusted vertically to bring them into proper alignment and in contact with the tube as it passes under and over them, respectively.

The straightening rolls 11, 12 are all positively driven by means of a chain 21, which is trained over sprocket wheels 22, 22 fixed to the shafts 13, 14 of the respective rolls. The manner in which the chain engages these sprockets is illustrated in Fig. 1, and it will be noted that a single chain is employed in connection with all the rolls. The upper lap of the chain runs above the top of the upright sides 17, 17 of the supporting frame for the rolls, and there runs over idler sprockets 23, 23 which are supported by brackets 24, 24 secured to the top of one of the side webs 17, as illustrated in Figs. 1 and 11.

The chain 21 is driven in the direction indicated by the arrow in Fig. 1 by a sprocket wheel 25 fixed to a shaft 26, which extends across and has its ends journaled in a suitable upright inverted U-shaped frame 27, which is fixed to the bed 1 of the machine in advance of the fin strip winding mechanism. The shaft 26 is driven from a shaft 28 by a chain 29 which runs over sprocket wheels fixed to the respective shafts, as shown in Figs. 1 and 6. The shaft 28 is driven from a shaft 30 through a meshing worm and worm gear 31, 32 fixed to these respective shafts. As shown in Fig. 6, an electric motor 33 suspended from the under side of the bed 1 furnished power for the machine. The manner in which the motor drives the shaft 30 will be hereinafter described.

The fin strip winding mechanism is arranged in advance of the bracket 27 and comprises a drum 34 disposed to have the coated tube 8 pass therethrough in the operation of the machine, as shown in Fig. 4. The drum is mounted to revolve on a horizontal axis in antifriction bearings 35, 35 arranged at the opposite ends of the drum, as shown in Fig. 4. These bearings may be of the roller type and have their upper races 36, 36 made separate from their lower races 37, 37 to facilitate the assembly of the parts and also their inspection and repair. The lower races 37 are preferably cast integral with a block 38 which rests on the base 1 and is bolted or otherwise rigidly secured thereto, as shown in Figs. 1 and 7.

The drum 34 is provided with a pair of surrounding sprockets 39, 40, over which run driving chains 41, 42, the latter extending down to and running over a sprocket fixed to the shaft 30 for driving the same, as shown in dotted lines in Fig. 1. The other chain 41 runs over a sprocket 43 on a shaft 44, which is suitably supported in a bracket assembly 45 secured to the rear side of the base 1 and extending outward and upward therefrom, as shown in Fig. 6. The hub of the sprocket 43 is secured to a worm gear 46, which meshes with a worm 47 on a shaft 48 arranged below the worm gear and suitably journaled in the bracket assembly 45, as shown in Fig. 6. A driving chain 49 connects the armature shaft of the motor 33 with the shaft 48 for driving the same, and thus imparting power to the drum 34 for rotating it. A suitable clutch mechanism is associated with the shaft 44 for connecting the motor 33 to and disconnecting it from the drum 34 so that the machine may be stopped and started as desired. The particular form of clutch mechanism shown in the drawings is of the friction cone type and embodies two members 50, 51, the former being fixed to the worm gear 46 and the latter keyed on the shaft 44 and adapted to be slid by a hand lever 52 into and out of clutched engagement with the former. The lever 52 is fulcrumed on the bracket 27 and extends to the front side of the machine for accessibility, as shown in Figs. 6 and 12.

An enlarged head 53 is secured to the front end of the drum 34 by screws 54 or other suitable means so that the head will be revolved with the drum. This head, as shown in the drawings, is in the form of a disc, although it may be in the form of a spider to lighten the part and save metal in its making. The disc 53 is constructed to carry the fin strip material which is to be spirally wound on the coated tube, as the disc is revolved about the tube and the latter fed through the center of the disc without rotation. In the drawings, I have shown the disc made to carry a multiple supply of fin strip material so that a number of fin strips may be spirally wound on the tube simultaneously and thus increase the rate of production of the machine. To accommodate the fin strip material, the disc 53 is provided on its front side with a plurality of recesses or cavities 55, 55 arranged at equal distances about the circumference of the head and having cover plates 56, 56 over them, as shown in Figs. 2 and 4. These plates are fastened in place on studs 57 which are carried by the disc 53 in the respective cavities 55. The fin strip material 58 is furnished in the form of rolls which are mounted on the studs 57 of the respective cavities 55, the studs forming axis members for the rolls as the rolls are turned in drawing the material therefrom during the operation of the machine.

To accomplish this, a small sprocket wheel 59 is mounted on a stub shaft 60 carried by the disc 53 at the outer end of each cavity 55 to one side of the roll 58 of fin strip material therein, as indicated in Fig. 2. The sprocket wheels 59 are on the rear side of the disc 53 and are driven by chains 61 which have their inner ends running over small sprocket wheels 62 adjacent the center of the disc, as shown in Fig. 5. Sprocket wheels 62 are fixed to the outer ends of shafts 63 journaled in the drum 34 and carried around with the same in the rotation of the drum. These shafts extend through the inner end of the drum and they are provided with gear pinions 64, 64 arranged about and in mesh with a sun gear 65, as shown in Figs. 4 and 7. The sun gear 65 is held against rotation by being clamped in a stationary cover plate 66, which is secured to the upper and lower race members 36, 37 of the rear bearing for the drum, as shown in Fig. 4. Thus, as the drum 34 is revolved by the motor 33, the planet pinions 64, 64 are rotated as they are carried with the drum about the sun gear, and thus through the chains 61 the sprockets 59 are rotated.

As shown in Fig. 9, each shaft 60 extends through the disc 53 to the front side thereof and there is provided with teeth 67 and guide plates 68, 68 at the opposite sides of the same. A similar toothed member 69 is carried by the disc 53 and meshes with the teeth 67 between the guide plates 68 so as to corrugate the fin strip material 58 as it is fed between said toothed members. The toothed members 67 being part of the shafts 60, the fin strip material is drawn off of the rolls 58 as said toothed members are revolved. After being corrugated, the fin strip material is fed toward the center of the disc and is wound spirally on the coated tube 8 which travels through the center of the disc by a feed on the tube to be hereinafter referred to.

Before reaching the center of the disc, the corrugated fin strip material passes through guide blocks 70, which are carried on the disc 53. These blocks have guide passages 71 extending therethrough and arranged parallel to the front face of the disc so as to turn the corrugated strips after they leave the corrugating rolls 67, 69 into a position at right-angles to the axis of the tube 8 and thus position the strips to be applied edgewise to the tube as the disc 53 is revolved about the tube.

Guide bars 72, 72 are mounted on the front face of the disc 53 in radial relation to the center of the disc and have their inner ends at the tube 8 where it passes through the center of the disc, as shown in Fig. 2. The number of guide bars employed equals the fin strips which are to be wound on the tube. In the drawings I have shown a machine equipped to wind three fin strips on the tube simultaneously, and thus employ three guide bars 72, one for each fin strip. These bars are mounted in undercut radial grooves 73 formed in the front face of the disc and are clamped in the grooves by screws 74, as shown in Fig. 10. Thus the bars may be adjusted so that the machine may operate on different sizes of tubes. Each guide bar 72 is provided at its inner end, that is, the end at the tube 8, with a plurality of spirally formed guide ribs 75, 75, as shown in Figs. 4, 13, and 14. These ribs provide each bar with at least three spiral passage-ways through which the fin strips 58 are guided on the tube. The first strip is started through the first groove of the first guide bar, extends from there through the second groove of the second guide bar, and then through the third groove of the third guide bar, each strip following a like course through the several bars. In starting the strips originally, their ends have to be attached (soldered) to the tube to hold them in place. The strips are guided on the tubes by the spiral ribs 75 of the several bars with the convolutions of the several strips placed apart lengthwise of the tube and one following the other in regular order. After the initial tacking, the strips are not touched again as the winding action conforms the strips to the tube, and the automatic soldering operation, to be presently described, fastens the fins to the tube through the entire lengths of the strips. The guide bars 72 receive the respective strips after they are corrugated by the rollers 67, 69 and after they leave the guide blocks 70.

A portion of a finished tube is shown in Fig. 16, and there it will be noted that the convolutions of the several fin strips are equally spaced apart with the fin strips in edgewise contact with the exterior of the tube. The tube having been coated with solder prior to the winding of the fin strips thereon, the latter may be readily soldered to the coated tube by subjecting the assembly to heat sufficient to fuse the solder coating for uniting the fin strips to the tube. In securing the fin strips to the tube in this way, it is unnecessary to apply molten solder over the tube and the fin strips after the latter have been wound on the tube, as has been the general practice heretofore. It is unnecessary to have the fin strips coated with solder, as the only place for the solder being needed is between the inner edges of the strips and the outer surface of the tube where it is necessary to secure the fin strips to the tube. With my machine and method of operation, the solder heretofore used for coating the fin strips is saved, which is an item of economy when a large production is considered.

The mechanism for feeding the tube endwise through the machine past the strip winding disc 53 without rotating the tube is preferably located between the tube straightening mechanism and the strip winding head. This feeding mechanism is somewhat detailed in Fig. 6, and, as there shown, consists of upper and lower fluted or roughened rolls 76, 77, which engage the tube above and below as illustrated. The roll 77 is fixed to the shaft 26, while the roll 76 is fixed to a shaft 78. The latter shaft is turned from the former by intermeshing gears 79, 80 on said shafts, as shown. These rolls, as shown, have side flanges to engage the tube on its opposite sides so as to aid in forcing the tube through the machine. To bring these flanges into proper frictional contact with the tube, the shaft 78 for the upper roll is adjustable endwise through the medium of the bearing screws 78ª, 78ª, which support the shaft in the bracket 27. With the straightening rolls 11, 12 engaging the tube and being positively driven, they also aid in feeding the tube through the machine and withdrawing the tube from the loosely mounted supply coil 8ª.

With my improved machine, the strip winding operation and the feed of the tube through the machine is continuous and unbroken. With the tube being fed through the machine without rotating the tube, the latter may be drawn directly into the machine from a supply in coil or roll form, which may be mounted immediately adjacent the entrance end of the machine, as shown in Fig. 1. Thus any length of tubing may be fed to the machine without requiring any more floor space for one length than another because the coil or roll from which the tubing is supplied to the machine may be set closely adjacent the entrance end of the machine regardless of the length of the tubing. Likewise, comparatively little space is required at the outlet end of the machine for the finished tube because the latter may also be wound up in coil or roll form on leaving the machine.

The fact that a multiplicity of fin strips are applied simultaneously to the tube permits the use of a steep pitch on each individual fin and still present the finished appearance of the tube, the same as if a single fin had been applied at a low pitch. With a steep pitch, there is greater contact between the fins and the tube, thus providing for increased heat radiation from the tube when the latter is used in radiator structures. Moreover, with a steep pitch more effective air deflecting surfaces are furnished by the fins which are at sharper angles. This also produces more rigid fins, because the latter are nearer a right-angular relation to the tube, and permits them to take outside pressures more edgewise than laterally, with the result that the fins withstand to a better advantage any external forces and strains which may tend to crush or flatten them against the tube.

As shown in Fig. 16, the outer peripheral edges of the wound strips are stretched substantially free of their corrugations. This happens in the winding of the strips on the tube and gives the strips an outside appearance of having straight edges with their inner edges still corrugated to increase their contact with the outer surface of the tube, as required for a firm connection.

To cause the chain 21 to properly engage the sprocket 25 after the upper lap of the chain leaves the sprocket 23 next adjacent the sprocket 25, I provide an idler sprocket 81 on a bracket 82 which extends out from the bracket 27, as shown in Figs. 1 and 6. The sprocket 81 is positioned so that the chain runs beneath its under side on its way to the upper side of the sprocket 25. In Fig. 1, I have shown a gas burner 83, over which the assembled tube and strip passes after leaving the winding disc 53. This burner is so made and positioned that sufficient heat is supplied to the tube to fuse the solder thereon and effect the soldering of the inner edge of the wound fin strips 58 to the tube. The grooves 73 and screws 74 enable the guide bars 72 to be adjusted toward and from the tube 8 as may be desired. These grooves also permit the bars to be applied to and removed from the disc 53 whenever desired, as for inspection and repair. For this purpose, the grooves open into larger slots 73ª in the disc, as shown in Fig. 4 and 5. The bars when slid into these slots may be removed from either side of the disc.

The details of construction and arrangement of parts shown and described may be variously changed and modified without departing from the spirit and scope of my invention.

I claim as my invention:

1. In a machine of the character described, the combination, of means for supporting a tube, means rotatable about the tube for presenting a sheet metal strip edgewise thereto and for winding the strip spirally on the tube, and means carried by the last named means for corrugating the strip as it is fed to the tube.

2. In a machine of the character described, the combination, of means for supporting a tube, means rotatable about the tube for presenting a sheet metal strip edgewise thereto and for winding the strip spirally on the tube, and means carried by the last named means for corrugating the strip as it is fed to the tube, winding means permitting the outer edge of the strip being stretched substantially free of corrugations in the winding of the strip on the tube.

3. In a machine of the character described, the combination, of means for supporting and feeding a tube endwise through the machine without rotating the tube, means fixed with respect to the endwise movement of the tube and rotatable about the same for presenting a sheet metal strip endwise thereto and for winding the strip spirally on the tube, and means carried by the last named means for corrugating the strip as it is fed to the tube.

4. In a machine of the character described, the combination, of means for supporting a tube, and means rotatable about the tube for presenting a plurality of sheet metal strips edgewise to the tube in spaced relation along the axis of the tube and for simultaneously winding the strips spirally thereon.

5. In a machine of the character described, the combination, of means for supporting and feeding a tube endwise through the machine without rotating the tube, and means fixed with respect to the endwise movement of the tube and rotatable about the same for presenting a plurality of sheet metal strips edgewise to the tube in spaced relation along the axis of the tube and for simultaneously winding the strips spirally thereon.

6. In a machine of the character described, the combination, of means for supporting and feeding a tube endwise through the machine without rotating the tube, means fixed with respect to the endwise movement of the tube and rotatable about the same for presenting a plurality of sheet metal strips edgewise to the tube in spaced relation along the axis of the tube and for simultaneously winding the strips spirally thereon, and means for corrugating the strips as they are fed to the tube.

7. In a machine of the character described, the combination, of means for feeding a tube endwise through the machine without rotating the tube, means fixed with respect to the endwise movement of the tube and rotatable about the same for presenting a sheet metal strip edgewise to the tube and for winding the strip spirally thereon, and means for coating the outside of the tube with solder as the tube is fed through the machine and before the strip is wound on the tube.

8. In a machine of the character described, the combination, of means for feeding a tube through the machine without rotating the tube, means fixed with respect to the endwise movement of the tube and rotatable about the tube for presenting a sheet metal strip edgewise to the tube and for winding the strip spirally thereon, means for coating the outside of the tube with solder as the tube is fed through the machine and before the strip is wound on the tube, and means for heating the assembled strip and tube as the latter passes from the winding means for soldering the strip to the tube.

9. In a machine of the character described, the combination, of means for feeding a tube endwise through the machine without rotating the tube, means fixed with respect to the endwise movement of the tube and rotatable about the same for presenting a plurality of sheet metal strips edgewise to the tube in spaced relation along the axis of the tube and for simultaneously winding the strips spirally thereon, means for coating the outside of the tube with molten solder as the tube is fed through the machine and before the strips are wound thereon, means for heating the assembled strips and tube as the latter passes from the winding means for soldering the strips to the tube, and means for corrugating the strips as they are fed to the tube.

10. In a machine of the character described, the combination, of a rotatably mounted head, means for rotating said head, means for feeding a tube endwise through the head without rotating the tube, means carried by the head and revoluble therewith for presenting a sheet metal strip edgewise to the tube and for winding the strip spirally on the tube, and rotary means carried by the head for corrugating the strip as it is fed to the tube.

11. In a machine of the character described, the combination, of a rotary head, means for rotating said head, means for feeding a tube endwise through the head without rotating the tube, and means carried by said head and revoluble therewith for presenting a plurality of sheet metal strips edgewise to the tube in spaced relation along the axis of the tube and for simultaneously winding the strips on the tube in that relation.

12. In a machine of the character described, the combination, of means for feeding a tube endwise through the machine without rotating the tube, a rotary member fixed with respect to the endwise movement of the tube and having a central opening for the passage of the tube therethrough, a plurality of rolls of sheet metal strip material carried by said member about the axis of the tube, means for rotating said member about the tube for effecting the simultaneous winding of the strips from the rolls spirally on the tube as the latter is fed through said member, and means on the member at the tube for guiding the several strips edgewise to the tube and in spaced relation along the axis of the tube.

13. In a machine of the character described, the combination, of means for feeding a tube endwise through the machine without rotating the tube, a rotary member fixed with respect to the endwise movement of the tube and having a central opening for the passage of the tube therethrough, a plurality of rolls of sheet metal strip material carried by said member about the axis of the tube, means for rotating the member about the tube for effecting the simultaneous winding of the strips spirally on the tube as the latter is fed through said member, means on the member at the tube for guiding the several strips edgewise to the tube and in spaced relation, and corrugating rollers carried by the member and operated in the rotation of said member for feeding the strips to the tube and for corrugating the strips before they reach the tube.

14. In a machine of the character described, the combination, of means for feeding a tube endwise through the machine without rotating the tube, a rotary member fixed with respect to the endwise movement of the tube and having a central opening for the passage of the tube therethrough, a plurality of rolls of sheet metal strip material carried by the member about the axis of the tube, means for rotating said member about the tube, guide bars carried by said member about the tube and having passages at their inner ends for guiding the strips edgewise to the tube and in spaced relation along the axis of the tube so that the strips will be wound simultaneously on the tube in spiral relation in the rotation of the rotary member and the feeding of the tube therethrough.

15. In a machine of the character described, the combination, of a rotary head, means for feeding a tube endwise through said head without rotating the tube, a roll of sheet metal strip material carried by the head, means carried by the head for guiding the strip spirally on the tube in the rotation of the head about the tube, corrugating rollers carried by the head for feeding the strip from the roll to the tube and for corrugating the strip as it is fed to the tube, and means including a planetary gearing associated with the head and operated in the rotation thereof for rotating said rollers.

16. In a machine of the character described, the combination, of a rotary head, means for feeding a tube endwise through the head without rotating the tube, a roll of sheet metal strip material carried by the head, means carried by the head for guiding the strip spirally on the tube in the rotation of the head about the tube, corrugating rollers carried by the head for feeding the strip from the roll to the tube and for corrugating the strip as it is fed to the tube, shafts journaled in the head, driving connections from the shafts to the rollers, and a planetary gearing for turning said shafts in the rotation of said head.

17. In a machine of the character described, the combination, of a rotary disc having a central opening for the passage of a tube therethrough, means for feeding the tube endwise through said passage, means for rotating said disc about the tube, means for presenting a sheet metal strip to the tube including guide bars on said disc and having their inner ends at the tube and provided with passages to guide the strips edgewise on the tube and in spiral formation in the rotation of the disc, said disc having grooves to accommodate said guide bars and larger slots at the outer ends of the grooves whereby the guide bars may be applied to and removed from said disc.

In testimony whereof I affix my signature.

CHARLES WM. OWSTON.